June 23, 1931.  J. MARTIN  1,811,057
COMBINATION COUCH AND BED
Filed Sept. 10, 1929  2 Sheets-Sheet 1
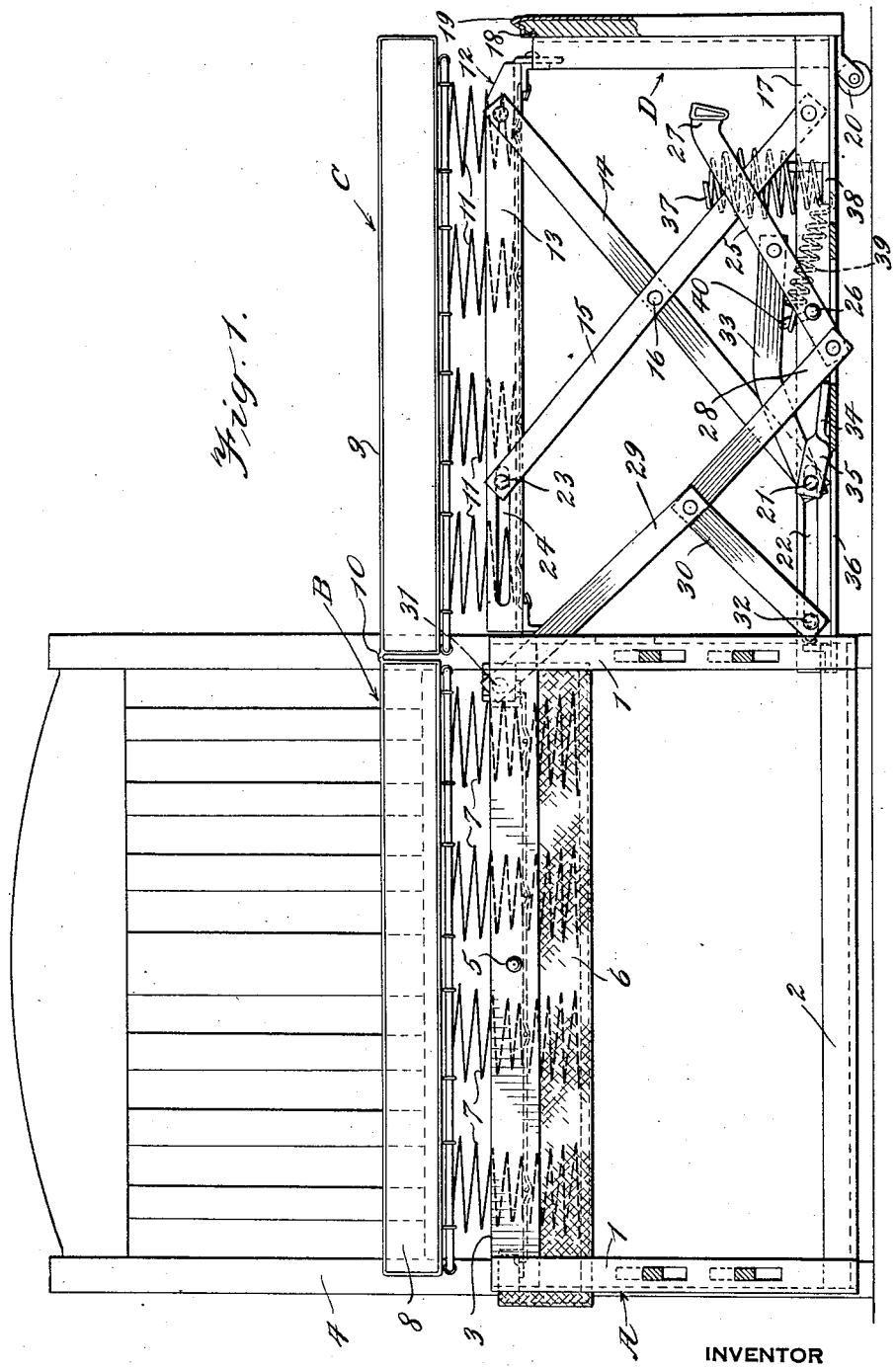
INVENTOR
Joseph Martin
BY
Gustav Drews
ATTORNEY June 23, 1931.  J. MARTIN  1,811,057
COMBINATION COUCH AND BED
Filed Sept. 10, 1929   2 Sheets-Sheet 2
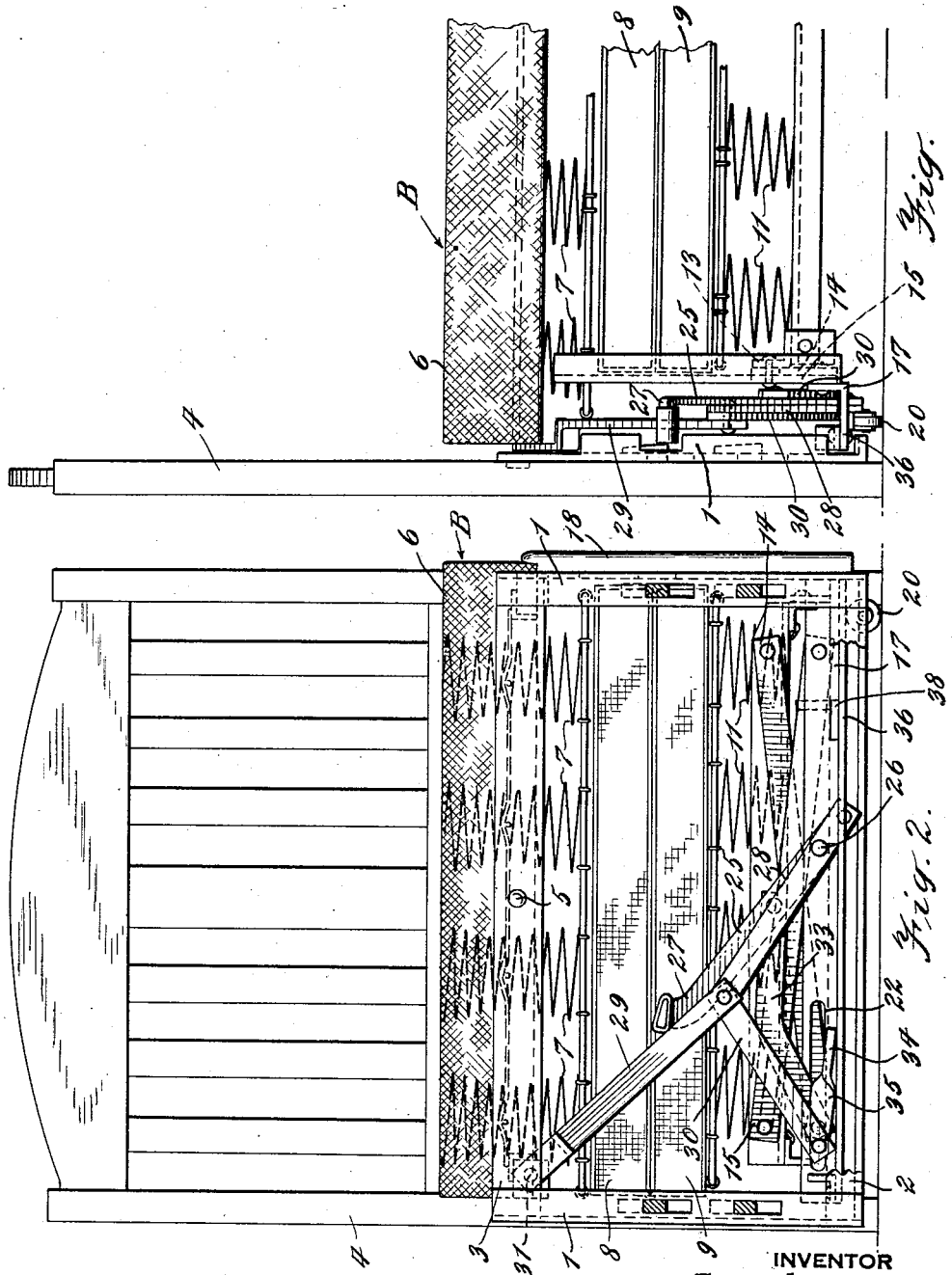
INVENTOR
Joseph Martin
BY
Gustav Drews
ATTORNEY Patented June 23, 1931

1,811,057

UNITED STATES PATENT OFFICE

JOSEPH MARTIN, OF NEW YORK, N. Y., ASSIGNOR TO UNITED STATES CABINET BED CO., OF BROOKLYN, NEW YORK, A CORPORATION OF NEW YORK

COMBINATION COUCH AND BED

Application filed September 10, 1929. Serial No. 391,587.

This invention relates to a combination couch and bed in general, and more especially to a combination couch and bed having two bed bottoms which are disposed alongside of one another in bed formation and which are disposed one above the other in couch formation.

Among the main objects of the present invention it is aimed to provide a combination couch and bed having two bed bottoms which are disposed alongside of one another in bed formation and which are disposed above one another in couch formation, and one of which bed bottoms is provided with a permanent upholstered portion facing upward in couch formation and facing downward in double bed formation.

It is a further object of the present invention to provide an improved combination couch and bed having a main bed bottom and an extension bed bottom, the main bed bottom having an upholstered portion which faces upward in couch formation and downward in bed formation, and the extension bed bottom being disposed beneath the main bed bottom in couch formation and alongside of the main bed bottom in bed formation.

It is still a further object of the present invention to provide an improved combination couch and bed having a main bed bottom provided with an upholstered portion which faces upwardly in couch formation and downwardly in bed formation, which extension bed bottom is disposed beneath the main bed bottom in couch formation and alongside of the main bed bottom in bed formation and which bed bottoms are operatively connected with one another so that the actuation of the extension bed bottom into bed formation causes the main bed bottom to be reversed so that its upholstered portion faces downwardly and in turn so that the actuation of the extension bed bottom into couch formation beneath the main bed bottom simultaneously causes the main bed bottom to be returned to position where its upholstered portion faces upwardly.

It is still another object of the present invention to provide an improved mechanism for cooperating with a main bed bottom having an upholstered portion and an extension bed bottom whereby the actuation of the extension bed bottom into bed formation simultaneously causes the main bed bottom to be turned to cause its upholstered portion to face downwardly and whereby the actuation of the extension bed bottom into couch formation beneath the main bed bottom simultaneously causes the main bed bottom to be returned to position where its upholstered portion faces upwardly.

These and other features, capabilities and advantages of the invention will appear from the subjoined detail description of one specific embodiment thereof illustrated in the accompanying drawings in which—

Figure 1 is an end elevation of a bed made according to the present invention with one of the end boards removed with the bed bottoms in double bed formation;

Fig. 2 is a similar end elevation with the bed bottoms in single bed or couch formation; and Fig. 3 is a fragmental side elevation of the present invention with the bed bottoms in single bed or couch formation.

In the embodiment illustrated, there is provided a bed frame A having two pairs of end uprights, each pair of uprights 1 having its lower ends connected by a cross bar 2 and its upper ends connected by a cross bar 3. Each pair of uprights 1 is connected to an end board 4, only one being shown in the present instance.

To the upper cross bars 3 and preferably at the middle thereof, there is pivotally connected the main bed bottom B by means of a pivot pin 5 pivotally connecting each end of the main bed bottom B with a cross bar 3. The main bed bottom B, in the present instance, is provided with an upholstered portion 6 which faces downwardly in the double bed formation illustrated in Fig. 1 and which faces upwardly in the couch or single bed formation illustrated in Figs. 2 and 3.

The main bed bottom B is also provided with a plurality of springs 7 which support a mattress portion 8 which faces upwardly in the double bed formation illustrated in Fig. 1. One longitudinal edge of the mattress portion 8 is hingedly connected to the mattress portion 9 formed on the extension bed bottom C by means of the fabric hinged number 10.

The mattress portion 9 is supported by the springs 11 to the frame portion 12 having the end bars 13. Each of the end bars 13, only one being shown in Fig. 1, is supported by a pair of cross bars 14 and 15. The bars 14 and 15 of each pair are pivotally connected to one another by the pin 16 and operatively connected to the carriage frame member D.

The carriage frame member D is provided with an end bar 17 at each end which are connected to one another by the longitudinal side board portion 18 which is preferably covered with a suitable decorative fabric 19, as illustrated. The end bars 17 adjacent the side board 18 are preferably provided with castors or rollers 20 to facilitate sliding the carriage member D into and out of double bed formation.

The bar 14 of each pair of cross bars 14 and 15, is pivotally connected at its upper end to an end bar 13 adjacent the side board 18 and provided with a pin 21 at its lower end slidably mounted in a slot 22 extending laterally in the end of a lower cross bar 17 remote from the side board 18. The upper end of the bar 15 of each pair of cross bars 14 and 15 is provided with a pin 23 slidably mounted in the laterally extending slot 24 formed in the end of an upper cross bar 13 remote from the side board 18, and the lower end of such bar 15 is pivotally connected to a cross bar 17 adjacent to the side board 18. The pairs of cross bars 14 and 15 are provided to support the extension bed bottom C in its raised position in the double bed formation and in turn to guide it into its depressed position there to support it in the couch formation illustrated in Figs. 2 and 3.

The pairs of cross bars 14 and 15 and the bed bottoms B and C cooperate so that the main bed bottom B rotates about the pins 5 into couch formation from double bed formation, and the bed bottom C descends and moves under the bed bottom B, in which position the upholstered portion 6 of the bed bottom B will face upwardly and in turn so that the bed bottom B will revolve about its pins 5 into the position where its upholstered portion faces downwardly when moving from couch formation into double bed formation, at which time the bed bottom C will move outwardly into its raised position where the mattress portion 9 is disposed alongside the mattress 8, as illustrated in Fig. 1.

For causing the pairs of cross bars 14 and 15 and bed formations B and C to cooperate with one another, there are provided two sets of mechanisms, each set secured to a cross bar 17. Each set is provided with an operating lever 25 fixed to the cross rod 26 which extends from one cross bar 17 to the other cross bar 17. Each lever 25 has a handle portion 27 and its lower end pivotally connected to the end of the link 28 which extends upwardly and is pivotally connected to the lower end of the link 29, see Fig. 1, and the upper end of the link 30.

The link 29 is pivotally connected at 31 to the edge of the main bed bottom B which is disposed adjacent to the end of the cross bar 13 when the bed bottoms are in double bed formation. The lower end of the link 30 is provided with a pin 32 which is slidably mounted in the slot 22. The lever 29 between the connecting rod 26 and the handle 27 is pivotally connected to the link 33 which is pivotally connected to the pin 21 at the lower end of the cross bar 14. To serve as a stop arm to cooperate with the link 28, there is provided the tongue 34 at the end of the bracket 35 which is pivotally connected to the pin 21 and slides on the rail portion 36 of the cross bar 17.

To form a buffer or cushion for the bed bottom C when it descends, there is provided the spring 37 preferably secured to the bracket 38 extending from one cross bar 17 to the other. To aid the lever 25 in its opening action when it operates to raise the bed bottom C, there is provided the spring 39 which connects the bracket 38 with the pin 40 extending from the rock shaft 26 on which the lever 25 is fixed.

From the foregoing it will appear that when the bed bottoms B and C are in the double bed formation, illustrated in Fig. 1, to thereupon convert this combination couch and double bed into couch formation, it is only necessary to engage the handle 27 of the lever 25 and rock it toward the main bed bottom B, at the same time moving the carriage D with it, whereupon the cross bars 14 and 15 will collapse to lower the extension bed bottom C and at the same time by the connection of the mattress portion 9 with the mattress portion 8 by the hinged portion 10 and the connection of the lever 25 with the bed bottom B by the links 28 and 29, the main bed bottom B will be revolved about its pins 5 until the main bed bottom B is finally turned to cause its upholstered portion 6 to face upwardly, and the bed bottom C has been moved under the bed bottom B with the carriage D, in which position, as illustrated in Fig. 2, the side board 18 will engage the edge of the upholstered portion 6 of the main bed bottom B.

In turn, when it is desired to convert the device into double bed formation from the condition illustrated in Fig. 1, it is only necessary to engage the handle 27 of the lever 25 and rock it outwardly simultaneously causing the carriage D to move outwardly when the extension bed bottom C will be caused to rise and the main bed bottom B will be caused to revolve until the mattress portions 8 and 9 aline with one another and the upholstered portion 6 faces downwardly.

It is obvious that various changes and modifications may be made to the details of construction without departing from the general spirit of the invention as set forth in the appended claims.

I claim:

1. The combination with a frame, of a main bed bottom pivotally connected to said frame to form a couch bed surface in one position and when reversed to form one of the bed bottoms of a double bed, a carriage guided by said frame to be movable from and into a position under said main bed bottom, the couch formation, and from and into a position adjacent said frame, the double bed formation, an extension bed bottom, means connecting the extension bed bottom to said main bed bottom, supporting means connecting said extension bed bottom with said carriage for supporting said extension bed bottom in lowered position beneath said main bed bottom in couch formation or in raised position adjacent to said main bed bottom as the other bed bottom of a double bed formation, means for actuating said carriage for inverting said main bed bottom and co-operating with said supporting means for lowering said extension bed bottom below said main bed bottom when actuating the bed bottoms into couch formation, said actuating means being also operative for reinverting said main bed bottom and co-operating with said supporting means for raising said extension bed bottom to one side of, and in alinement with said main bed bottom for actuating said bed bottoms into double bed formation, and means connecting said supporting means with said actuating means.

2. The combination with a frame, of a main bed bottom pivotally connected to said frame medially of its lateral ends with its couch surface uppermost in one position and its reverse surface uppermost in double bed formation, a carriage guided by said frame to be movable from and into a position under said main bed bottom, the couch formation, and from and into a position adjacent to said frame, the double bed formation, an extension bed bottom, cross bars connecting said extension bed bottom with said carriage for supporting said extension bed bottom in lowered position beneath said main bed bottom in couch formation or in raised position adjacent to said main bed bottom as the other bed bottom of a double bed formation, means for actuating said carriage for movement of said main bed bottom about its pivotal point into and out of said couch formation and for movement of said cross bars to lower said extension bed bottom into and out of position beneath said main bed bottom in couch formation and in turn for actuating said carriage for movement of said main bed bottom about its pivotal point into and out of double bed formation and for movement of said cross bars to raise said extension bed bottom into and out of positin alongside of said main bed bottom in double bed formation, and means for connecting said cross bars with said actuating means.

3. The combination with a frame, of a main bed bottom having a couch upholstered portion on one surface and pivotally connected medially of its ends to said frame with its upholstered portion uppermost in one position, the couch formation, and its reverse portion uppermost in another position, the double bed formation, a carriage guided by said frame to be movable from and into a position under said main bed bottom, the couch formation, and from and into a position adjacent to said frame, the double bed formation, an extension bed bottom, means connecting said extension bed bottom to said main bed bottom, cross bars connecting said extension bed bottom to said carriage for supporting said extension bed bottom in lowered position beneath said main bed bottom in couch formation or in raised position adjacent to said main bed bottom as the other bed bottom of a double bed formation, means for actuating said carriage whereby said main bed bottom is inverted to cause its upholstered portion to face upwardly and said cross bars are actuated to cause said extension bed bottom to move beneath said main bottom in couch formation and in turn said main bed bottom reinverted to cause its upholstered portion to face downwardly and said cross bars actuated to cause said extension bed bottom to move into position alongside of said main bed bottom in double bed formation, and means for connecting said crossbars with said actuating means.

4. The combination with a frame, of a main bed bottom pivotally connected to said frame with one surface facing upwardly in couch formation and the other surface facing upwardly in double bed formation, an extension bed bottom, means connecting said extension bed bottom to said main bed bottom, a carriage guided by said frame to be movable from and into a position under said main bed bottom, the couch formation, and from and into a position adjacent to said frame, the double bed formation, two pairs of cross bars connecting said extension bed bottom with said carriage for supporting said extension bed bottom in lowered position beneath said main bed bottom in couch formation or in raised position adjacent to said main bed bottom as the other bed bottom of a double bed formation, one of the bars of each pair of cross bars being pivotally connected at one of its ends to said extension bed bottom and slot and pin connected at its other end to said carriage and the other of each pair of bars being pivotally connected at one of its ends to said carriage and slot and pin connected at its other end to said extension bed bottom, a lever pivotally connected to said carriage, and links pivotally connecting said lever to said cross bars and to said main bed bottom whereby actuation of said lever will cause said main bed bottom to invert and to move said extension bed bottom beneath said main bed bottom into couch formation and in turn to reinvert said main bed bottom and to move said extension bed bottom alongside of said reinverted main bed bottom into double bed formation.

5. The combination with a frame, of a main bed bottom having an upholstered couch portion forming one surface and a mattress forming its opposite surface and pivoted medially of its ends to said frame with its couch portion facing upwardly in one position and its mattress facing upwardly in the other position, an extension bed bottom having a mattress hingedly connected to the mattress of said main bed bottom, a carriage guided by said frame to be movable from and into a position under said main bed bottom, the couch formation, and from and into a position adjacent to said frame, the double bed formation, cross bars connecting said carriage to said extension bed bottom, a lever pivotally connected to said carriage, and links pivotally connecting said lever to said cross bars and to said main bed bottom whereby actuation of said lever will simultaneously operate said main bed bottom and said extension bed bottom above one another with the upholstered couch portion facing upwardly and in turn operate said bed bottoms into position alongside of one another where said mattresses are disposed alongside of one another and facing upwardly.

6. The combination with a frame, of a main bed bottom pivotally connected medially of its ends to said frame with one surface facing upwardly in couch formation and the other surface facing upwardly in double bed formation, a carriage guided by said frame to be movable from and into a position under said main bed bottom, the couch formation, and from and into a position adjacent to said frame, the double bed formation, an extension bed bottom, extensible means connecting said extension bed bottom to said carriage, a lever pivotally connected to said carriage, and links connecting said lever to said extensible means and to said main bed bottom whereby actuation of said lever will cause said main bed bottom to invert and to move said extension bed bottom beneath said main bed bottom in couch formation and in turn to reinvert said main bed bottom and move said extension bed bottom into position alongside of said reinverted main bed bottom in double bed formation.

JOSEPH MARTIN.